UNITED STATES PATENT OFFICE.

LUIGI CHIALIVA AND JULES DUPONT, OF ECOUEN, FRANCE.

FIXATIVE VARNISH FOR DRAWINGS.

SPECIFICATION forming part of Letters Patent No. 645,248, dated March 13, 1900.

Application filed December 19, 1899. Serial No. 740,923. (No specimens.)

*To all whom it may concern:*

Be it known that we, LUIGI CHIALIVA, painter, and JULES DUPONT, landlord, of Ecouen, (Seine-et-Oise,) in the Republic of France, have invented a new kind of fixative for drawings made with crayons, charcoal crayon, lead-pencil, red chalk, drawing-pencil, and the like, of which the following is a full, clear, and exact description.

Our invention consists of a new neutral and light fixative having the advantage of rapidly drying by virtue of the volatile products composing the same. Such product enables us to fix drawings made with color-crayons, charcoal crayon, crayons, and pencils of all kinds on certain tracing-papers, on cardboard, wood, plaster, and generally on all materials which are of such porosity as to absorb the liquid projected thereon or which have been rendered absorptive by means of a special sizing. This product being almost entirely neutral, possesses the advantage of not altering or modifying either the color of the crayons or pencils or that of the paper upon which the fixative is applied.

Our fixative has for its basis casein and alcohol, and for obtaining the same we proceed in the following manner: For preparing a liter of fixative we dissolve about twenty-five grams of chemically-pure casein, free of grease, in two hundred or two hundred and fifty grams of distilled water saturated with borax and heated to a temperature of about 40° centigrade. The casein is left to dissolve and to rest during a few days, said dissolution being carried on more or less rapidly, according to the more or less elevated temperature of the room in which the operation takes place. Practically a normal temperature of 20° centigrade, or thereabout, is perfectly suitable. After the casein has been completely dissolved we slowly pour the solution into seven hundred and fifty or eight hundred cubic centimeters of pure alcohol, preferably methylic alcohol, which is 99.5 per cent. absolute or pure, which is free of acetone, care being taken that the mixture be continuously stirred. The product looks then like milk, and after having been left to rest for about twenty days it clarifies and forms a slight deposit. It is decanted and is then ready for use.

Our fixative prepared as hereinbefore explained is practically neutral and exerts but a very slight action upon litmus. This product is applied in the same way as other fixatives generally employed, it being projected upon the drawing in the state of a fine liquid spray by means of any suitable atomizer.

We claim—

A neutral fixative for drawings made with crayons, charcoal crayon, and pencils of all kinds (with the exception of fatty pencils) said fixative consisting of chemically-pure casein dissolved in distilled water saturated with borax, the solution being mixed with pure alcohol, free of acetone, and then decanted after having been left to rest for a certain time, substantially as hereinbefore described.

The foregoing specification of our new kind of fixative for the drawings made with crayons, charcoal crayon, lead-pencil, red chalk, drawing-pencil, and the like signed by us this 7th day of December, 1899.

LUIGI CHIALIVA.
JULES DUPONT.

Witnesses:
EDWARD P. MACLEAN,
MAURICE H. SIGNET.